(12) United States Patent
Choi et al.

(10) Patent No.: US 9,807,603 B2
(45) Date of Patent: Oct. 31, 2017

(54) METHOD AND SYSTEM FOR WIBRO NETWORK INTERWORKING IN WIRELESS TERMINAL

(75) Inventors: Wook Choi, Hwaseong-si (KR); Yong Lee, Seoul (KR); Hyo-Hyun Choi, Seoul (KR); Yong-Seok Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1717 days.

(21) Appl. No.: 11/907,519

(22) Filed: Oct. 12, 2007

(65) Prior Publication Data

US 2008/0117855 A1 May 22, 2008

(30) Foreign Application Priority Data

Nov. 16, 2006 (KR) ........................ 10-2006-0113215

(51) Int. Cl.
| | |
|---|---|
| H04W 8/30 | (2009.01) |
| H04B 7/155 | (2006.01) |
| H04W 28/26 | (2009.01) |
| H04W 80/04 | (2009.01) |
| H04W 84/12 | (2009.01) |

(52) U.S. Cl.
CPC ............ *H04W 8/30* (2013.01); *H04W 28/26* (2013.01); *H04W 80/04* (2013.01); *H04W 84/12* (2013.01); *H04B 7/155* (2013.01)

(58) Field of Classification Search
None
See application file for complete search history.

(56) References Cited

U.S. PATENT DOCUMENTS

| | | | |
|---|---|---|---|
| 6,452,915 B1 * | 9/2002 | Jorgensen | ................ H04L 1/20 370/328 |
| 6,980,660 B1 | 12/2005 | Hind et al. | |
| 7,006,472 B1 * | 2/2006 | Immonen et al. | ............ 370/332 |

(Continued)

FOREIGN PATENT DOCUMENTS

KR    10-2007-0105810    10/2007

OTHER PUBLICATIONS

Final Office Action dated Aug. 5, 2011 for U.S. Appl. No. 12/073,356.

*Primary Examiner* — Alpus H Hsu
*Assistant Examiner* — Hooman Houshmand
(74) *Attorney, Agent, or Firm* — H.C. Park & Associates, PLC

(57) ABSTRACT

A method and system for WiBro network interworking in a wireless terminal. The method includes: setting up, by a relay station for connecting the WLAN terminal with the WiBro network, a connection through an initial process with the WiBro network; performing, by an access router, Internet connection authentication on a user of the WLAN terminal in response to a request for Internet connection from the WLAN terminal; allocating, by the access router, an IP address in response to a request for IP address allocation from the WLAN terminal, and then allocating, by a WiBro radio access station, a unique Connection IDentification (CID) corresponding to a QoS level of the terminal user in response to a request from the relay station; and mapping, by the relay station, the allocated unique CID to the IP address of the WLAN terminal and providing Internet service.

12 Claims, 10 Drawing Sheets

(56) References Cited

U.S. PATENT DOCUMENTS

| | | | |
|---|---|---|---|
| 7,317,708 B2* | 1/2008 | Moon | H04L 29/12367 370/310 |
| 7,440,757 B2* | 10/2008 | Kwon et al. | 455/436 |
| 2002/0075844 A1* | 6/2002 | Hagen | H04L 63/0442 370/351 |
| 2005/0089052 A1* | 4/2005 | Chen et al. | 370/401 |
| 2005/0286451 A1* | 12/2005 | Kim | H04W 8/26 370/310 |
| 2006/0098614 A1* | 5/2006 | Moon | H04L 29/12367 370/338 |
| 2006/0153132 A1* | 7/2006 | Saito | H04B 7/155 370/329 |
| 2006/0172738 A1* | 8/2006 | Kwon | H04W 36/12 455/439 |
| 2006/0274643 A1 | 12/2006 | Choyi et al. | |
| 2007/0115899 A1* | 5/2007 | Ovadia et al. | 370/338 |
| 2007/0140169 A1* | 6/2007 | Rajagopalan | 370/331 |
| 2007/0255793 A1 | 11/2007 | Kwon et al. | |
| 2008/0095124 A1* | 4/2008 | Ramos et al. | 370/336 |
| 2008/0101292 A1* | 5/2008 | Sengupta et al. | 370/331 |

\* cited by examiner

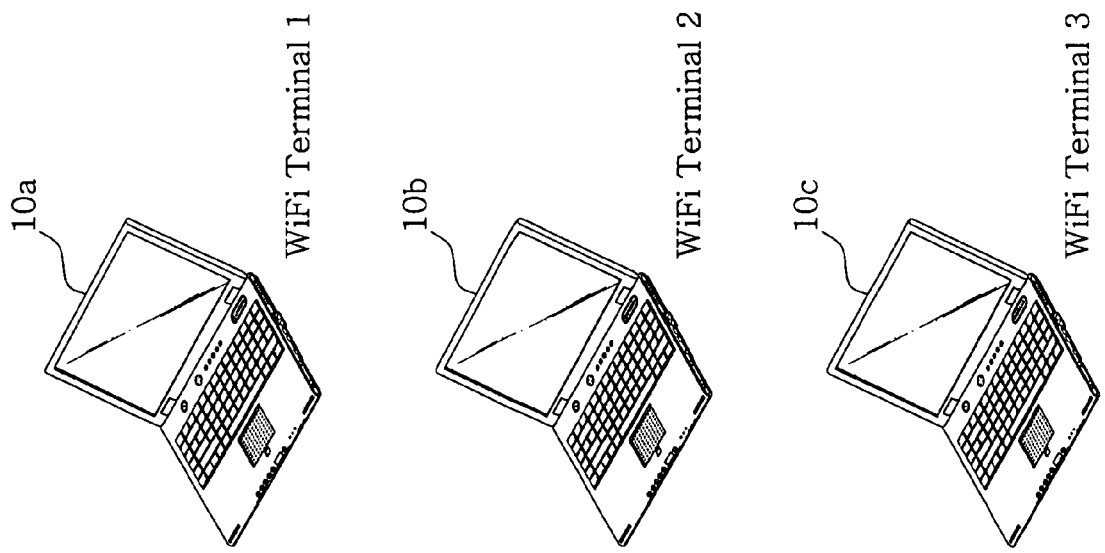
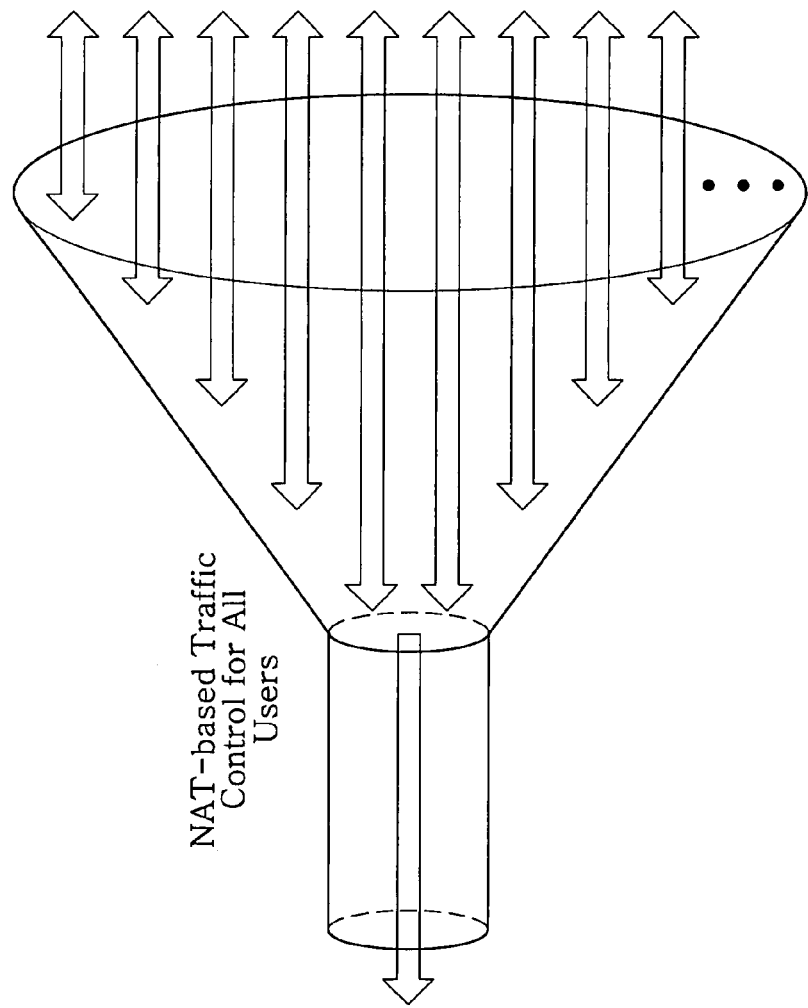
FIG. 2

METHOD AND SYSTEM FOR WIBRO NETWORK INTERWORKING IN WIRELESS TERMINAL

CLAIM OF PRIORITY

This application makes reference to, incorporates the same herein, and claims all benefits accruing under 35 U.S.C. §119 from an application for METHOD AND SYSTEM FOR WiBro NETWORK INTER WORKING IN WIRELESS TERMINAL earlier filed in the Korean Intellectual Property Office on 16 Nov. 2006 and there duly assigned Serial No. 2006-113215.

BACKGROUND OF THE INVENTION

Field of the Invention

The present invention relates to a method and system for WiBro (Wireless Broadband) network interworking in a wireless terminal.

Description of the Related Art

WiBro is a wireless broadband Internet technology being developed by the Korean telecoms industry. WiBro is the Korean service name for IEEE 802.16e (mobile WiMAX) international standard.

Advanced wireless data communication technology widens the width of selection for users of wireless data service by building a wireless network using different types of wireless techniques (e.g., WLAN 802.11a/b/g, 3G HSDPA, WiMAX, WiBro, etc.).

In particular, a WLAN (Wireless Local Area Network) environment using an unlicensed band is widely used because of its relative advantages, such as low connection cost, even though it does not provide mobility.

A UMTS-WLAN (Universal Mobile Telecommunications System/Wireless Local Area Network) interworking wireless router for providing connectivity to WiFi users is already available in a 3G network. Normally, a wireless (mobile) router serving unlicensed band users in an IPv4 environment uses Network Address Translation (NAT).

A NAT technique was developed for allowing several users to access a network by sharing one or more public IP addresses taking into account insufficiency of IP addresses. Several WiFi users are assigned one private IP address and have access to the Internet by sharing one public IP given to the router.

Translation of TCP/UDP port information should be performed so that one public IP is shared by several users. The translation is called "IP masquerading" in a Linux environment.

The NAT was developed to address insufficiency of IPv4 addresses by allowing several WiFi users allocated respective private addresses to access a public IP network (e.g., the Internet) by using one public IP.

Accordingly, when users with their private addresses access the public IP network, visibility of the users by the public network is not considered to be an important issue. Public network providers do not use the NAT much because of unsatisfactory user management of the NAT.

The users are indistinguishable from each other following translation into the public IP (Internet Protocol) address. Since TCP/UDP (Transmission Control Protocol/User Datagram Protocol) ports are also translated for each user service, users are not distinguishable by use of the ports.

Of course, a NAT-based router is able to manage traffic and QoS (Quality of Service) for each user by using a private address through packet-specific processing, but such management greatly affects performance of the network. Upgrading hardware as a solution to performance degradation increases a relevant cost.

Also, implementation of access disabling and enabling functionality for each user greatly increases complexity.

SUMMARY OF THE INVENTION

It is an object of the present invention to provide a method and system for WiBro network interworking in a wireless terminal, which are capable of increasing use of a WiBro/WiMAX-based Broadband Wireless Access (BWA) network by providing a user-oriented Internet connectivity to a user that uses an unlicensed band in the BWA environment.

According to one aspect of the present invention provides a method for WiBro network interworking in a WLAN terminal, the method comprising the steps of: setting up, by a relay station for connecting the WLAN terminal with the WiBro network, a connection through an initial process with the WiBro network; performing, by an access router, Internet connection authentication on a user of the WLAN terminal in response to a request for Internet connection from the WLAN terminal; allocating, by the access router, an IP address in response to a request for IP address allocation from the WLAN terminal, and then allocating, by a WiBro radio access station, a unique Connection IDentification (CID) corresponding to a QoS level of the terminal user in response to a request from the relay station; and mapping, by the relay station, the allocated unique CID to the IP address of the WLAN terminal and providing Internet service.

The step of performing, by an access router, Internet connection authentication on a user of the WLAN terminal in response to a request for Internet connection from the WLAN terminal may comprise the steps of: transmitting an Internet connection authentication request message to the WiBro network in response to the request for Internet connection from the WLAN terminal; and transmitting an Internet connection authentication response message from the WiBro network to the WLAN terminal.

The Internet connection authentication request message may comprise MAC (Media Access Control) address information that is user information of the WLAN terminal making the request for Internet connection.

In the step of allocating, by the access router, an IP address in response to a request for IP address allocation from the WLAN terminal, and then allocating, by a WiBro radio access station, a unique Connection IDentification (CID) corresponding to a QoS level of the terminal user in response to a request from the relay station, the IP address may be an IPv6 or public IPv4 address using a dynamic host configuration protocol (DHCP) allocated from the WiBro network.

According to another aspect of the present invention provides a method for WiBro network interworking in a WLAN terminal, the method comprising the steps of: setting up, by a relay station for connecting the WLAN terminal with the WiBro network, a connection through an initial process with the WiBro network; performing, by an access router, Internet connection authentication on a user of the WLAN terminal in response to a request for Internet connection from the WLAN terminal; allocating, by the relay station, an IP address in response to a request for IP address allocation from the WLAN terminal, and then allocating, by a WiBro radio access station, a unique Connection IDentification (CID) corresponding to a QoS level of the terminal user in response to a request from the relay station; and mapping, by the relay station, the allocated unique CID to a MAC address of the WLAN terminal and providing Internet service.

The step of performing, by an access router, Internet connection authentication on a user of the WLAN terminal in response to a request for Internet connection from the WLAN terminal may comprise the steps of: transmitting an Internet connection authentication request message to the WiBro network in response to the request for Internet connection from the WLAN terminal; and transmitting an Internet connection authentication response message from the WiBro network to the WLAN terminal.

The Internet connection authentication request message may comprise MAC address information that is user information of the WLAN terminal making the request for Internet connection.

In the step of allocating, by the relay station, an IP address in response to a request for IP address allocation from the WLAN terminal, and then allocating, by a WiBro radio access station, a unique Connection IDentification (CID) corresponding to a QoS level of the terminal user in response to a request from the relay station, the IP address may be a private IPv4 address using a dynamic host configuration protocol (DHCP) allocated from the relay station for interworking with the WiBro network.

In the step of allocating, by the relay station, an IP address in response to a request for IP address allocation from the WLAN terminal, and then allocating, by a WiBro radio access station, a unique Connection IDentification (CID) corresponding to a QoS level of the terminal user in response to a request from the relay station, the unique CID may be identified by a source IP, a destination IP, a source port, a destination port, and a security key.

The step of mapping, by the relay station, the allocated unique CID to a MAC address of the WLAN terminal and providing Internet service may comprise the steps of: creating a new port by port mapping between a source port of an application flow forwarded from the WLAN terminal and a source port of the unique CID; creating a mapping table including port mapping information between the newly created port and the source port of the unique CID; translating the source port of the application flow into the newly created port, and transmitting a packet having the translated port to a web server having a destination port on a web; creating a destination port of the application flow forwarded from the WLAN terminal by port mapping between a destination port of a packet received from the web server and a source port of a unique CID mapped to the destination port; and translating the destination port of the packet received from the web server into the destination port created by port mapping and transmitting a packet having the translated port to an application process of the WLAN terminal.

The step of creating a new port by port mapping between a source port of an application flow forwarded from the WLAN terminal and a source port of the unique CID may comprise performing port mapping through an exclusive OR operation of the source port of the application flow and the source port of the unique CID.

The step of creating a destination port of the application flow forwarded from the WLAN terminal by port mapping between a destination port of a packet received from the web server and a source port of a unique CID mapped to the destination port may comprise performing port mapping through an exclusive OR operation of the destination port of the packet received from the web server and the source port of the unique CID mapped to the destination port.

According to another aspect of the present invention provides a system for WiBro network interworking in a WLAN terminal, the system comprising: a relay station for making a request for allocation of a unique Connection IDentification (CID) corresponding to a QoS level of a user of the WLAN terminal in response to a request for Internet connection from the WLAN terminal; and a WiBro radio access station for allocating the unique CID for Internet connection of the WLAN terminal in response to the request from the relay station, wherein the relay station maps the unique CID allocated by the WiBro radio access station to a node ID of the WLAN terminal and provides Internet service to the WLAN terminal user.

The relay station may comprise: a WiBro connection manager for performing a WiBro initial process with a radio access station on the WiBro network; a WLAN host AP for authorizing association with the WLAN terminal when there is a request for WiBro network connection from the WLAN terminal; a WiBro interworking setup manager for setting up a connection for WiBro network interworking of the WLAN terminal according to an IP network in use when user authentication requested by the WLAN host AP is successful; and a mapper for mapping a unique CID allocated by a WiBro radio access station to a node ID of the WLAN terminal when network interworking is set up by the WiBro interworking setup manager.

In particular, when the IP network in use is an IPv4 network using a private address, the WiBro interworking setup manager may create a new port by port mapping between a source port of an application flow forwarded from the WLAN terminal and a source port of the unique CID, and transmit and receive a packet by using a mapping table including port mapping information between the newly created port and the source port of the unique CID.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 2 illustrates a traffic flow in FIG. 1;

DETAILED DESCRIPTION OF THE INVENTION

Hereinafter, exemplary embodiments of the present invention will be described in detail with reference to the accompanying drawings so that those skilled in the art to which the present invention pertains can easily carry out the present invention.

Figure 1:
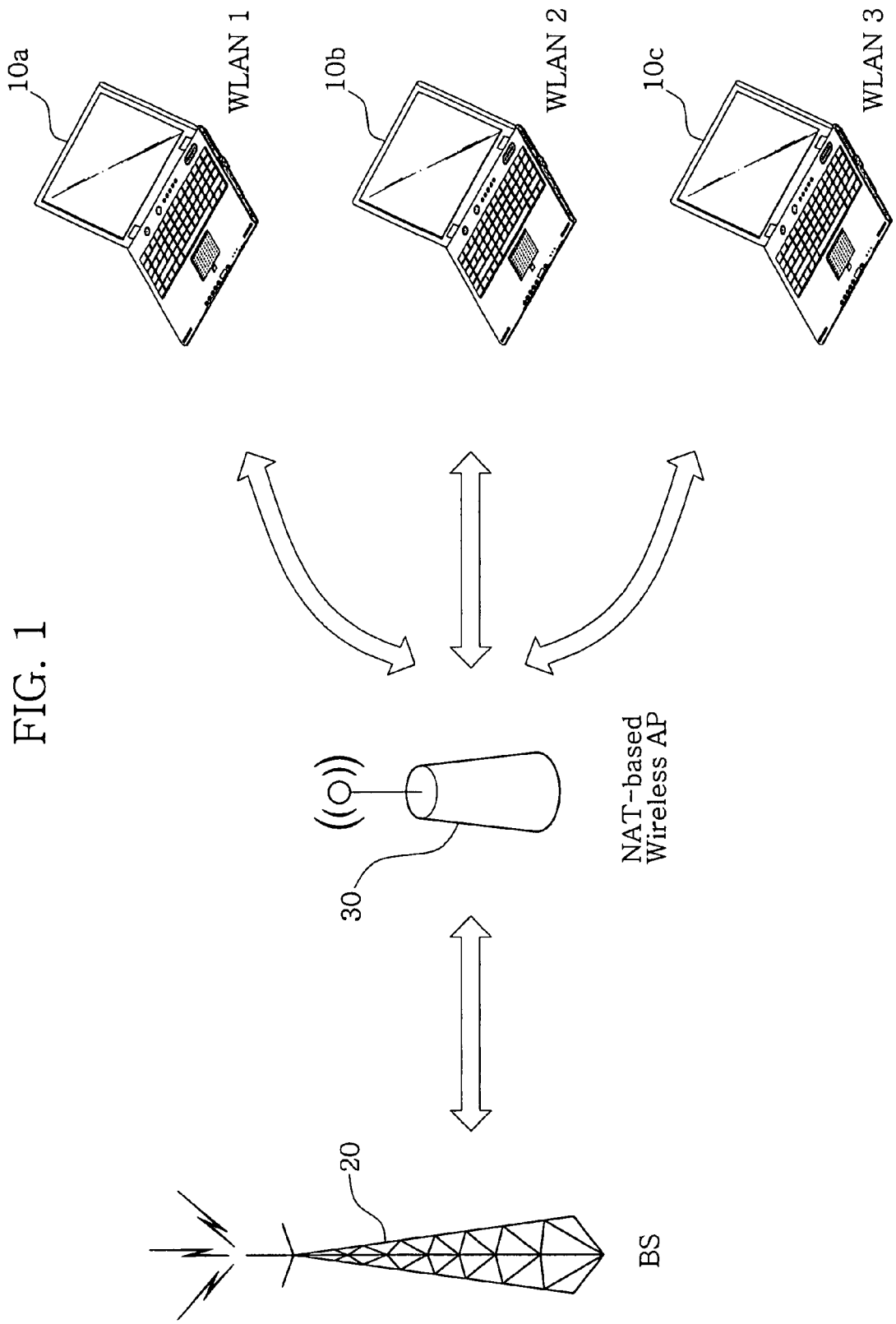
FIG. 1 illustrates a UMTS-WLAN Interworking architecture using Network Address Translation (NAT)

FIG. 1 illustrates a UMTS-WLAN Interworking architecture using Network Address Translation (NAT), and FIG. 2 illustrates a traffic flow in FIG. 1.

Referring to FIG. 1, Internet service may be provided to users of a plurality of WiFi terminals 10a, 10b, and 10c via a Network Address Translation (NAT)-based wireless Access Point (AP) 30, which is in wireless communication with a WiBro base station (BS) 20.

In particular, the NAT-based wireless AP 30 provides a NAT function to translate private IP addresses of the WiFi terminals into a public IP address so that the WiFi terminals may access a public IP network (e.g., the Internet) via the single public IP address.

All traffic flows transmitted by the WiFi terminals 10a, 10b, and 10c via various user applications are transmitted to a WiBro system under control of the NAT-based wireless AP (Access Point), as shown in FIG. 2.

Figure 3:
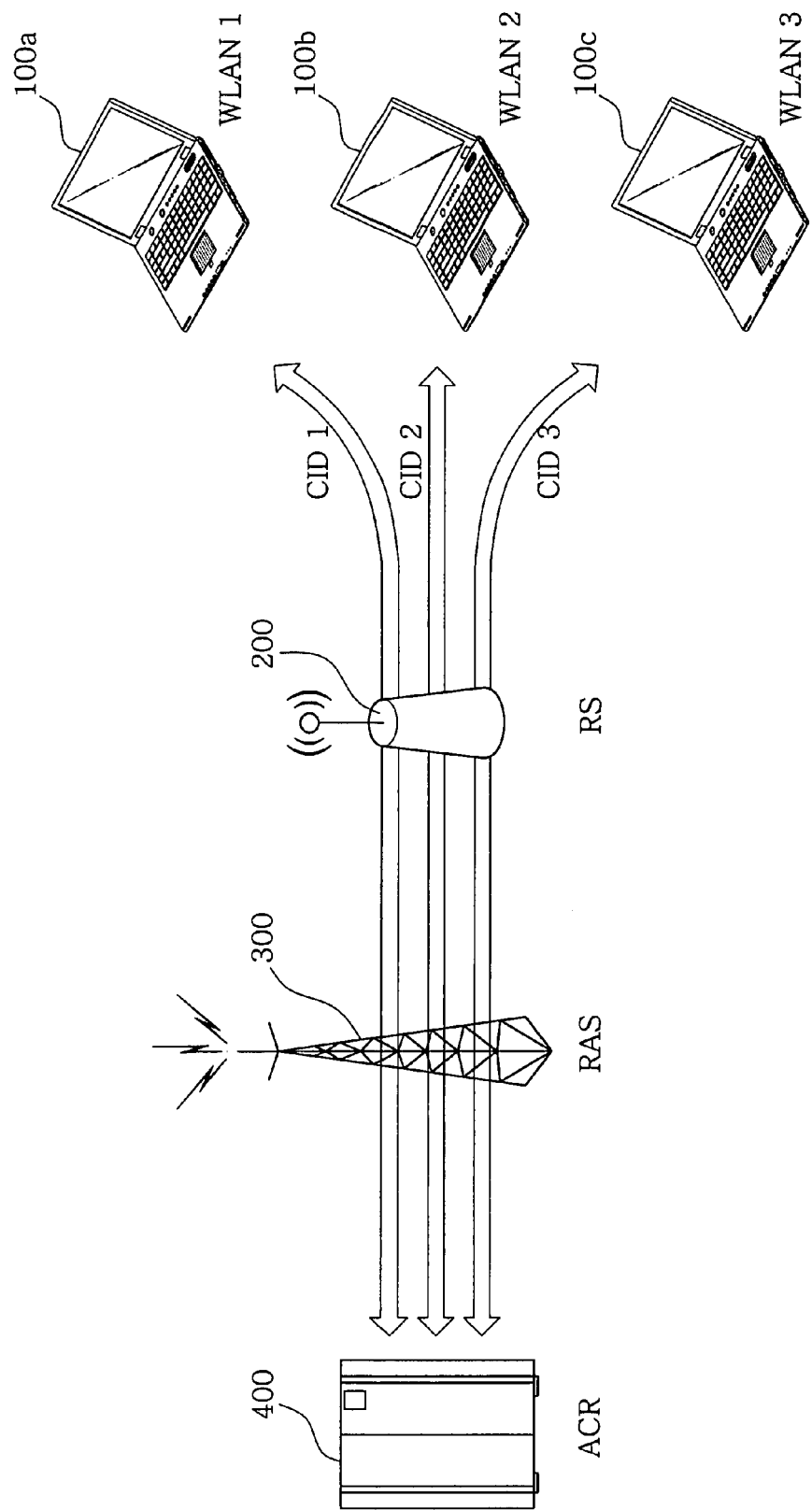
FIG. 3 illustrates a BWA-UMA (Broadband Wireless Access—Unlicensed Mobile Access) Interworking architecture according to the present invention.
Figure 4:
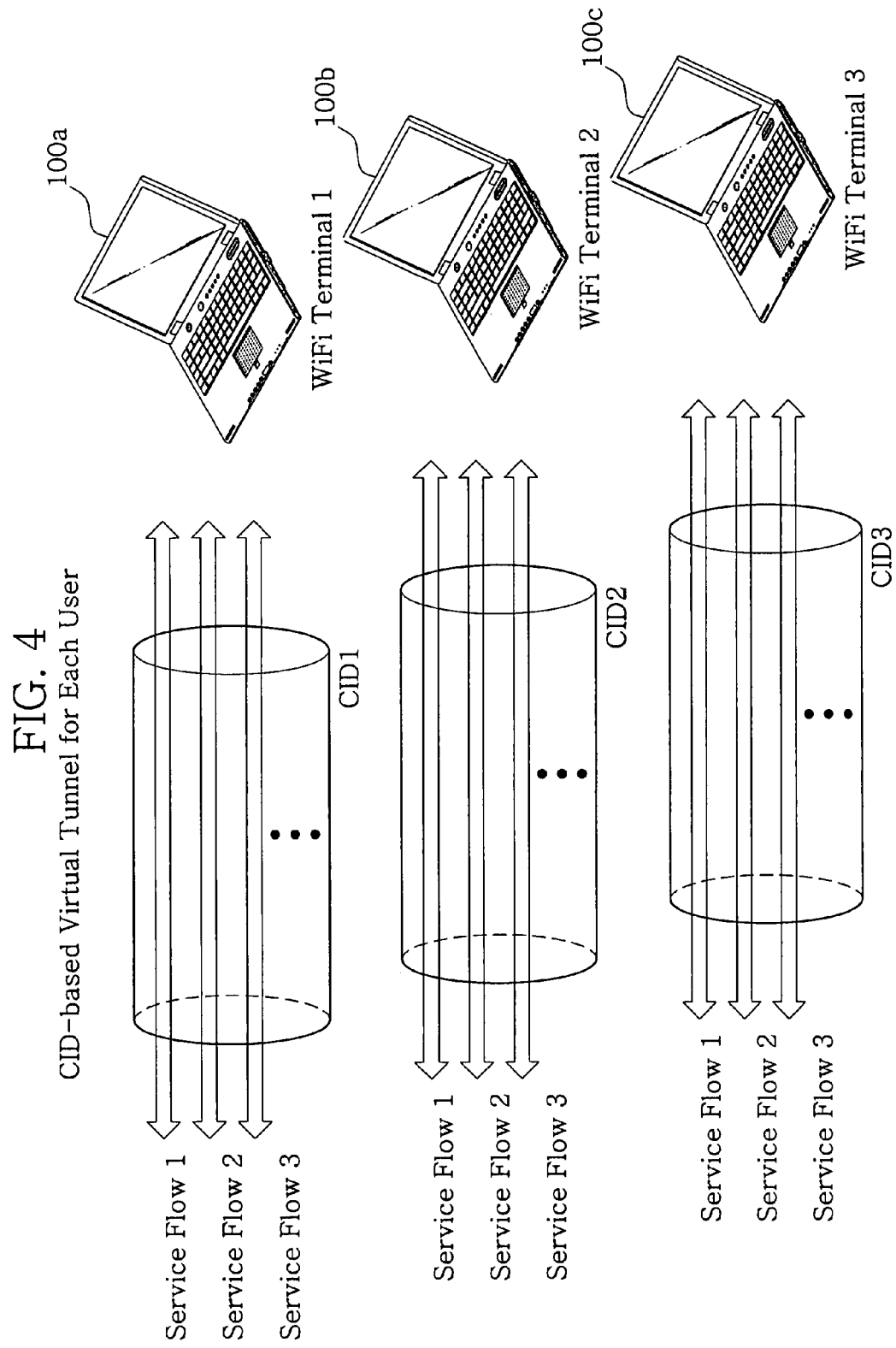
FIG. 4 illustrates a traffic flow in FIG. 3.

FIG. 3 illustrates a BWA-UMA (Broadband Wireless Access—Unlicensed Mobile Access) Interworking architecture according to the present invention, and FIG. 4 illustrates a traffic flow in FIG. 3.

Referring to FIG. 3, the BWA-UMA Interworking architecture of the present invention includes a plurality of WiFi WLAN terminals 100a, 100b, and 100c; a relay station (RS) 200; a WiBro radio access station (RAS) 300 and an access router (ACR) 400.

The WLAN terminals 100a, 100b, and 100c use an unlicensed band. Internet service (Unlicensed Mobile Access (UMA), also known as Generic Access Network (GAN)) is provided to the WLAN terminals 100a, 100b, and 100c via the RS 200.

The RS 200 builds a BWA network such as WiBro/ WiMAX with the WLAN terminals 100a, 100b, and 100c, which use the unlicensed band, to provide the Internet service to the WLAN terminals 100a, 100b, and 100c.

The WiBro RAS 300 provides Internet service to the WiFi terminals as well as the WiBro terminals. When a WiFi terminal makes a request for a UMA Internet connection, the RS 200 requests the WiBro RAS 300 to allocate a unique Connection IDentification (CID) number to the WiFi terminal. In response to the RS's request, the WiBro RAS 300 allocates the unique CID number to the WiFi terminal.

The access router 400 is in wireless communication with a plurality of WiBro RASs in the WiBro network. In particular, the access router 400 allocates a public IP address to the relay station 200 in response to a request from the relay station 200 in a WiBro initial process.

Also, the access router 400 performs UMA connection authentication on the WiFi terminal in response to the request from the relay station 200, which responds to the request for UMA connection from the WiFi terminal.

In the BWA-UMA Interworking architecture of the present invention, the WiFi WLAN terminals 100a, 100b, and 100c can transmit and receive various traffic service flows, such as service flow 1, service flow 2, and service flow 3, on user applications via CID-based virtual tunnels CID 1, CID 2, and CID 3, as shown in FIG. 4.

Figure 5:
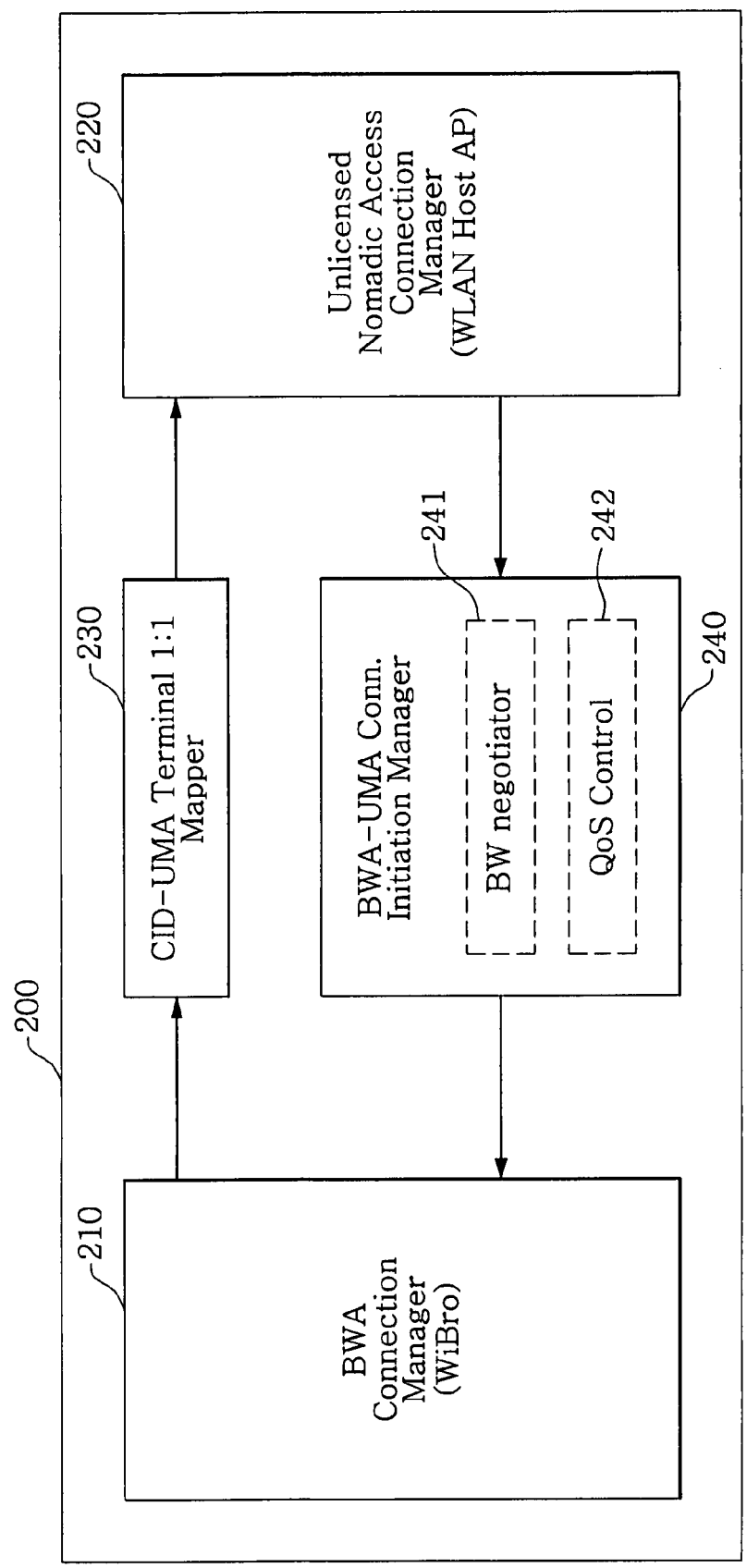
FIG. 5 illustrates a configuration of a relay station (RS) for BWA-UMA interworking in FIG. 3.

FIG. 5 illustrates a configuration of the relay station (RS) 200 for BWA-UMA Interworking in FIG. 3.

Referring to FIG. 5, the relay station 200 of the present invention includes a BWA connection manager 210, a WLAN host AP 220, a CID-UMA terminal 1:1 mapper 230, and a BWA-UMA connection initiation manager 240.

The BWA connection manager 210 performs a WiBro initial process with the WiBro RAS 300 so that the Internet service is provided to the WiFi terminal via the WiBro system.

Here, the WiBro initial process includes ranging, SS (subscriber station) basic capability, authentication, registration, and service addition, which will be described in detail below.

When there is a request for WiBro network association from the WiFi terminal, the WLAN host AP 220 authorizes the association with the WiFi terminal.

In other words, when the WiFi terminal transmits an association request message to the WLAN host AP 220 in order to access the WiBro network, the WLAN host AP 220 authorizes the association with the WiFi terminal. The association request message includes a MAC address that is user information of the WiFi terminal.

If the WiFi terminal association is successful, the WLAN host AP 220 transmits to the WiBro network an access request message including the user information (MAC address) via the BWA-UMA connection initiation manager 240.

Upon receipt of the access request message from the WLAN host AP 220, the BWA-UMA connection initiation manager 240 interworking with the BWA connection manager 210 transmits a user authentication request message including the user information (MAC address) to the WiBro network in order to make a request for user authentication. When the user authentication is successful, the BWA-UMA connection initiation manager 240 receives a response message from the WiBro network and notifies the WiFi terminal of the successful authentication.

When the user authentication is successful, the BWA-UMA connection initiation manager 240 also sets up a connection for BWA-UMA Interworking dependent on an IP network in use. Here, the connection for BWA-UMA Interworking is set up in a different manner depending on whether the IP network in use is a public IP network or a private IP network, as described in detail with reference to FIGS. 6 and 7.

In particular, if the IP network is an IPv4 network using a private address, a port mapping unit for allowing for several service flows of one user over an established unique virtual link CID is further required, as described in detail with reference to FIG. 10.

The BWA-UMA connection initiation manager 240 includes a BW (Band-Width) negotiator 241 for bandwidth negotiation upon transmission and reception of IP packets, and a QoS controller 242. The BWA-UMA connection initiation manager 240 may be implemented in a BWA core network component in light of efficiency.

The CID-UMA terminal 1:1 mapper 230 performs CID-UMA mapping between the virtual link CID allocated by the WiBro RAS 300 and the WiFi terminal in a one-to-one correspondence when the BWA-UMA Interworking connection is set up by the BWA-UMA connection initiation manager 240.

Of course, the CID-UMA terminal 1:1 mapper 230 may also map a plurality of different CID number groups to one UMA.

A connection setup process performed based on a used IP for BWA-UMA Interworking will now be described in detail with reference to FIGS. 6 and 7.

Figure 6:
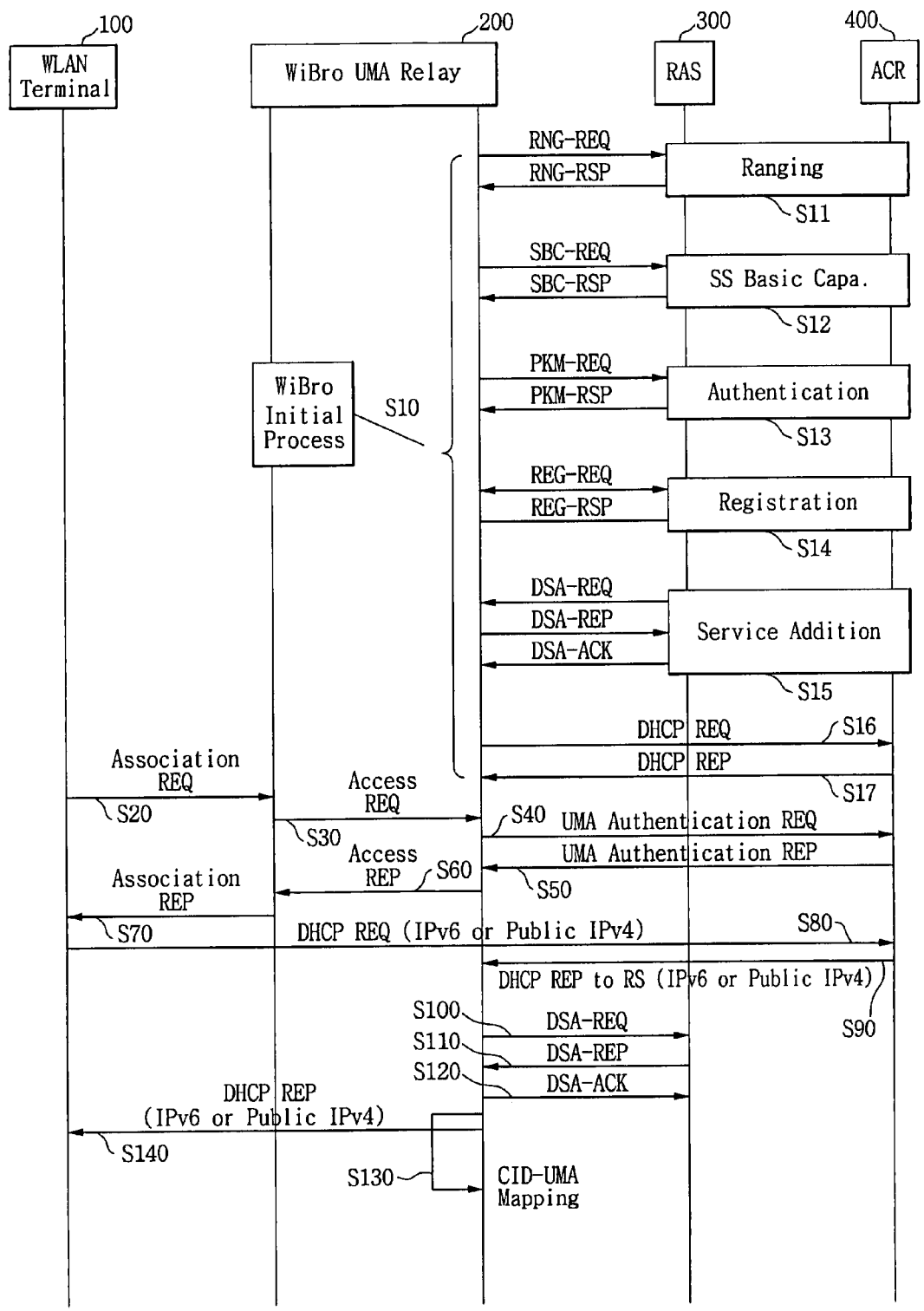
FIG. 6 illustrates a BWA-UMA relay station connection setup sequence upon using an IPv6 and public IPv4 network according to the present invention.

FIG. 6 illustrates a BWA-UMA relay station connection setup sequence upon using an IPv6 and public IPv4 network according to the present invention.

Referring to FIG. 6, the relay station 200 first performs a connection setup process S10 with a WiBro core network to obtain a basic/primary/secondary ID for transmission and reception of MAC management messages, a transport ID (TID) for transmission and reception of data, and an IP address. This connection setup process is the same as a connection setup process for data communication of a portable subscriber station (PS).

In such a WiBro initial process, a ranging (RNG) process S11 by a RNG-REQ/RNG-RSP message transmission and reception between the relay station 200 and the WiBro RAS 300 is first performed and then an SS basic capability (SBC) process S12 by SBC-REQ/SBC-RSP message transmission and reception is performed.

Subsequently, an authentication process S13 by PKM-REQ/PKM-RSP (PKM: privacy key management protocol) message transmission and reception between the relay station 200 and the WiBro RAS 300 is performed and a registration (REG) process S14 by REG-REQ/REG-RSP message transmission and reception is performed.

Subsequently, a service addition process S15 by DSA-REQ/DSA-REP/DSA-ACK (DSA: dynamic service addition) message transmission and reception between the relay station 200 and the WiBro RAS 300 is performed and a DHCP REQ/DHCP RSP (DHCP: dynamic host configuration protocol) message transmission and reception process (S16 and S17) for public IP address allocation of the relay station itself is performed.

The relay station 200, after completing the WiBro initial process, waits for a UMA request from the WLAN terminal 100.

When the WLAN terminal 100 transmits an association REQ message to the relay station 200 in order to access the WiBro network (S20), the WLAN host AP 220 of the relay station 200 authorizes the association with the WLAN terminal 100 by transmitting the association REQ message. Here, the association REQ message includes MAC address information that is user information of the WiFi terminal 100 transmitting the association REQ message.

In the relay station 200, the WLAN host AP 220 then transmits an access REQ message including the MAC address information of the WLAN terminal 100 to the BWA connection manager 210 via the BWA-UMA connection initiation manager 240 (S30).

The BWA connection manager 210 of the relay station 200 then transmits a UMA authentication REQ message including the MAC address information of the WLAN terminal 100 to the access router 400 of the WiBro network in order to make a request for user authentication (S40).

If the user authentication is successful, the access router 400 of the WiBro network transmits a UMA authentication REP message to the relay station 200 as a response message to the UMA authentication REQ message (S50).

The relay station 200 transmits an access REP message in response to the access REQ message in order to notify that the user authentication was successful (S60), and transmits an association REP message in response to the association REQ message to the WLAN terminal 100 (S70).

After the WiBro initial process and the user UMA authentication process are completed, the WLAN terminal 100 transmits a DHCP REQ (IPv6 or public IPv4) message to the access router (ACR) 400 of the WiBro network in order to make a request for IPv6 or public IPv4 address allocation using a dynamic host configuration protocol (DHCP) (S80).

In response to the address allocation request from the WLAN terminal 100, the ACR 400 of the WiBro network allocates the IPv6 or public IPv4 address and transmits a DHCP REP-to-RS (IPv6 or public IPv4) message including the allocated IP address information to the relay station 200 (S90).

After the IP address allocation to the WLAN terminal 100 is successful, the relay station 200 transmits a dynamic service addition request (DSA-REQ) MAC management message to the WiBro RAS 300 in order to make a request for allocation of a unique Connection IDentification (CID) number corresponding to a QoS level of the WLAN terminal 100 (S100).

In response to the unique CID number allocation request of the relay station 200, the WiBro RAS 300 allocates the unique CID number corresponding to the QoS Level of the WLAN terminal 100 and transmits a DSA-REP message including the allocated unique CID number information to the relay station 200 (S110).

Upon receipt of the DSA-REP message from the WiBro RAS 300, the relay station 200 transmits a DSA-ACK message to the WiBro RAS 300 (S120).

After the unique CID number allocation to the WLAN terminal 100 has been completed, the relay station 200 performs a CID-UMA mapping process between the allocated unique CID number and the WLAN terminal 100 (S130).

Finally, the relay station 200 relays and transmits a DHCP REP (IPv6 or public IPv4) message, which is a response message to the DHCP REQ (IPv6 or public IPv4) message, to the WLAN terminal 100 in order to notify that the IP allocation has been completed (S140).

As described above, since each WiFi terminal is allocated the unique public IP upon using the IPv6 and public IPv4 network, the user management is possible by mapping the private virtual link CID to the allocated public IP without implementing an additional function, such as packet processing. The user management is also possible through CID-MAC mapping between the private virtual link CID and the unique MAC address of the WLAN terminal 100.

The BWA-UMA relay station connection setup sequence upon using an IPv6 and public IPv4 network has been described so far. A BWA-UMA relay station connection setup sequence upon using a private IPv4 network will be described with reference to FIG. 7.

Figure 7:
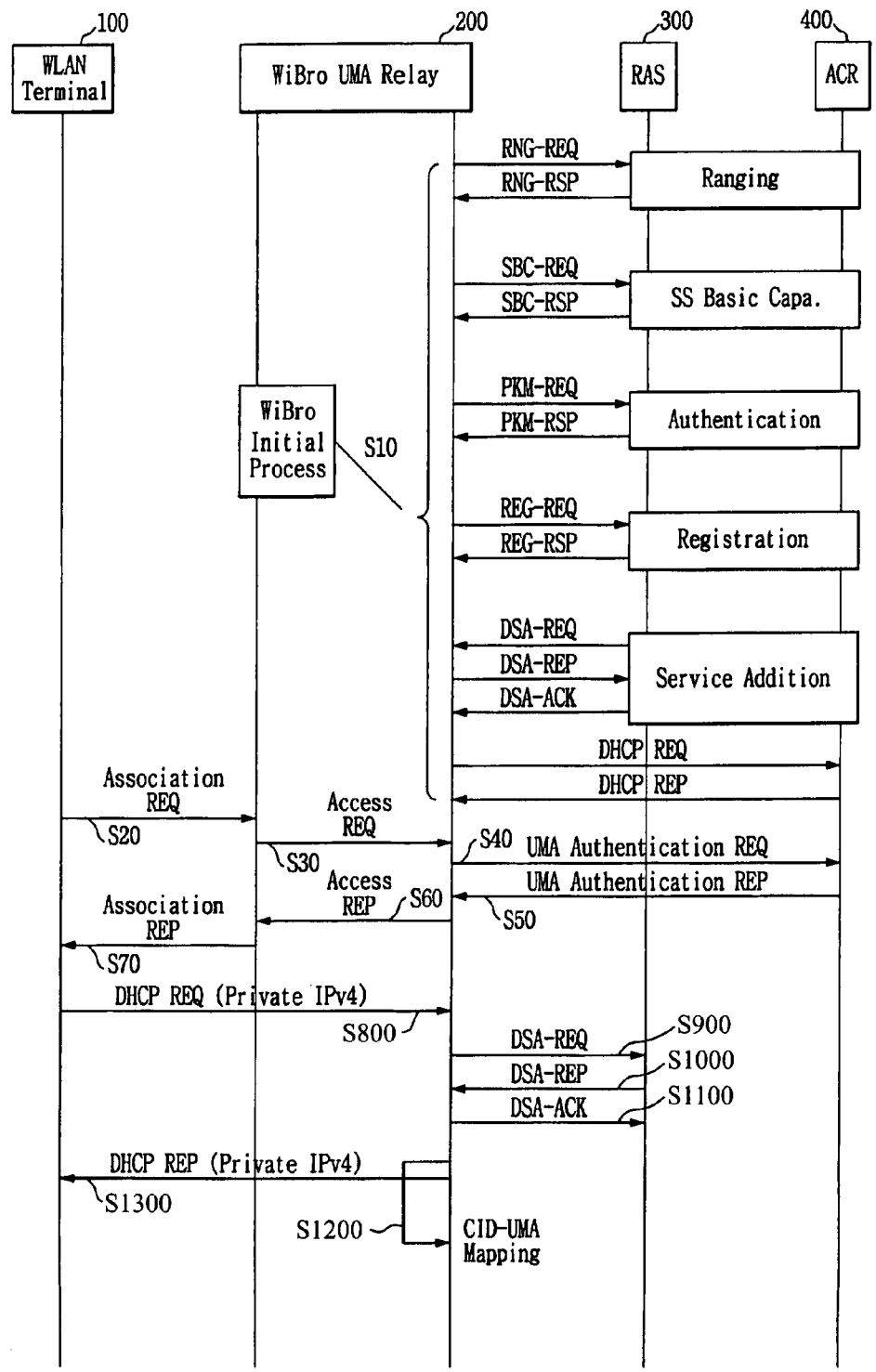
FIG. 7 illustrates a BWA-UMA relay station connection setup sequence upon using a private IPv4 network according to the present invention.

FIG. 7 illustrates a BWA-UMA relay station connection setup sequence upon using a private IPv4 network according to the present invention.

Referring to FIG. 7, the relay station 200 performs a WiBro initial process (S10) and waits for a UMA request from the WLAN terminal 100, as in the use of the IPv6 and public IPv4 network. Since the WiBro initial process has been described above, a description thereof will be omitted.

When the WLAN terminal 100 transmits an association REQ message to the relay station 200 in order to access the WiBro network (S20), the WLAN host AP 220 of the relay station 200 authorizes the association with the WLAN terminal 100 transmitting the association REQ message. Here, the association REQ message includes MAC address information that is user information of the WLAN terminal 100 transmitting the association REQ message.

In the relay station 200, the WLAN host AP 220 then transmits an access REQ message including the MAC address information of the WLAN terminal 100 to the BWA connection manager 210 via the BWA-UMA connection initiation manager 240 (S30).

The BWA connection manager of the relay station 200 then transmits a UMA authentication REQ message including the MAC address information of the WLAN terminal 100 to the access router 400 of the WiBro network in order to make a request for user authentication (S40).

When the user authentication is successful, the access router (ACR) 400 of the WiBro network transmits a UMA authentication REP message to the relay station 200 as a response message to the UMA authentication REQ message (S50).

The relay station 200 transmits an access REP message in response to the access REQ message in order to notify that the user authentication was successful (S60), and transmits an association REP message in response to the association REQ message to the WLAN terminal 100 (S70).

After the WiBro initial process and the user UMA authentication process are completed, the WLAN terminal 100 transmits a DHCP REQ (private IPv4) message to the relay station 200 in order to make a request for private IPv4 address allocation using a dynamic host configuration protocol (DHCP) (S800).

In response to the private IPv4 address allocation request from the WLAN terminal 100, the relay station 200 allocates the private IPv4 address, and then transmits a dynamic service addition request (DSA-REQ) MAC management message to the WiBro RAS 300 in order to make a request for allocation of a unique Connection IDentification (CID) number corresponding to a QoS level of the user of the WLAN terminal 100 (S900).

In response to the number allocation request of the relay station 200, the WiBro RAS 300 allocates the unique CID number corresponding to the QoS Level of the WLAN terminal 100 and transmits a DSA-REP message including the allocated unique CID number information to the relay station 200 (S1000).

Upon receipt of the DSA-REP message from the WiBro RAS 300, the relay station 200 transmits a DSA-ACK message to the WiBro RAS 300 (S1100).

After the unique CID number allocation to the WLAN terminal 100 has been completed, the relay station 200 performs a CID-UMA mapping process between the allocated unique CID number and the WLAN terminal 100 (S1200).

Finally, the relay station 200 relays and transmits a DHCP REP private IPv4 message, which is a response message to the DHCP REQ private IPv4 message, to the WLAN terminal 100 in order to notify that the IP allocation has been completed (S1300).

As such, the use of private IPv4 network necessitates the Network Address Translation (NAT) function, unlike the use of the IPv6 or public IPv4 network.

In other words, the translation is performed with respect to the IP Packet of each WLAN terminal by using the public IP of the relay station 200 allocated in the WiBro initial connection process of the relay station 200.

In particular, a unique virtual link CID that the relay station 200 obtains using DSA-REQ in the above process is identified by five tuple (Quintuple or Pentuple), which includes a source IP, a destination IP, a source port, a destination port and a security key. A source port and a destination port for each CID are uniquely given by the relay station 200.

However, when several WLAN terminals attempt to access the network as in FIG. 8, the allocation of one CID to each WLAN terminal for management causes the following problems, as described in detail with reference to FIG. 8.

Figure 8:
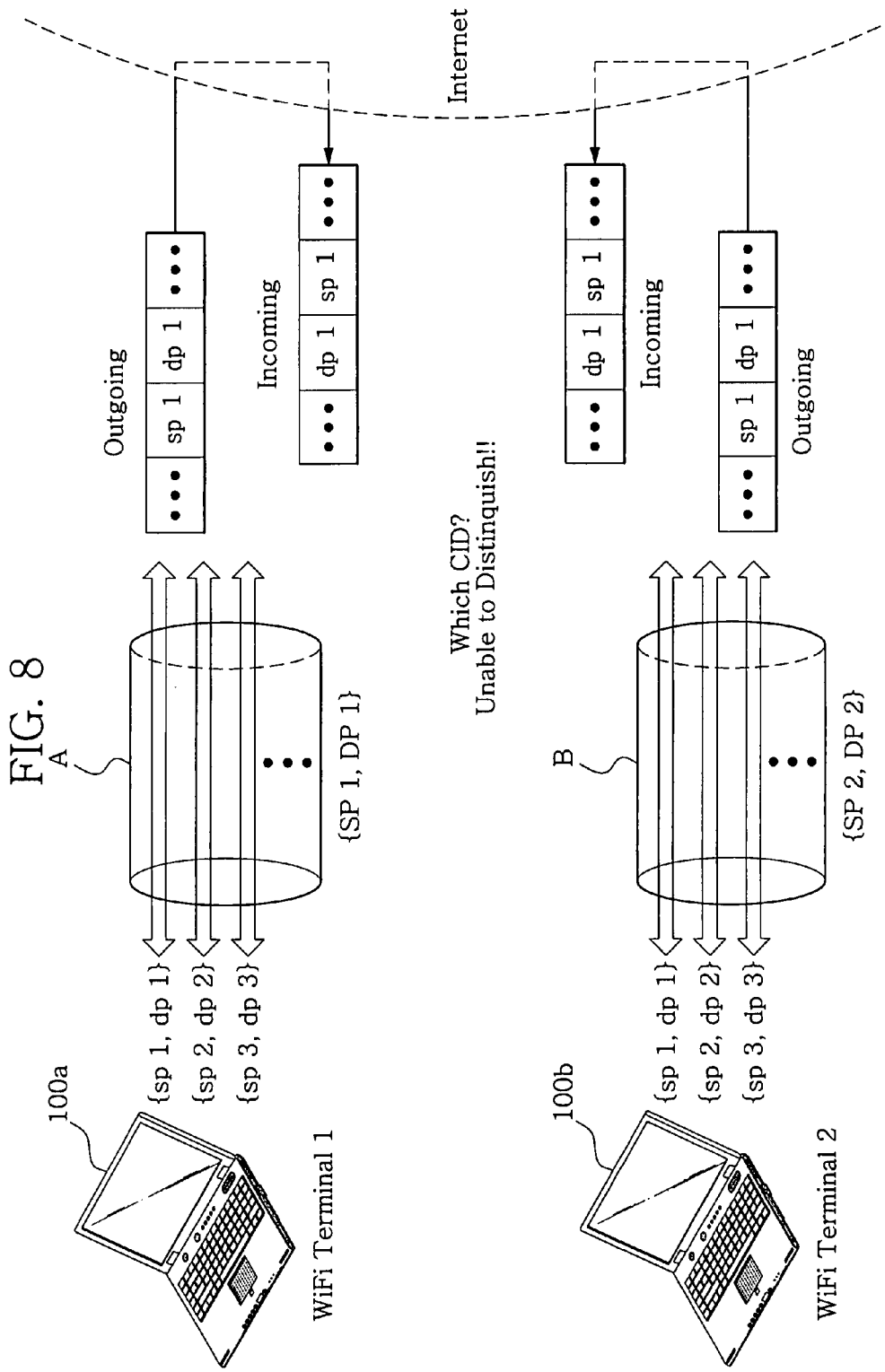
FIG. 8 illustrates an exemplary embodiment of translation performed on only an IP address when source and destination ports given to each application of a plurality of WLAN terminals are the same as in a case where NAT is used.

FIG. 8 illustrates an exemplary embodiment of the translation performed on only an IP address when source and destination ports (sp and dp) given to each application of a plurality of WiFi WLAN terminals are the same as in a case where NAT is used.

In FIG. 8, source and destination ports for each flow given to applications of the first and second WiFi WLAN terminals 100a and 100b are the same between the first and second WLAN terminals 100a and 100b. Here, {SPn, DPn} are source and destination port numbers given to the CID by the relay station 200, and {spn, dpn} are source and destination port numbers given for each service flow of the WLAN terminals.

When the first and second WLAN terminals 100a and 100b simultaneously forward IP packets having the same source and destination ports for each flow via the first CID A and the second CID B, respectively, incoming IP packets are received as a response to such outgoing IP packets and have the same source and destination ports. Accordingly, the incoming IP packets are indistinguishable from each other, which makes it difficult to determine whether any one of the first CID A and the second CID B is used for packet transmission. Here, the incoming packets have the destination port corresponding to the source port of the outgoing packets and the source port corresponding to the destination port of the outgoing packets.

Figure 9:
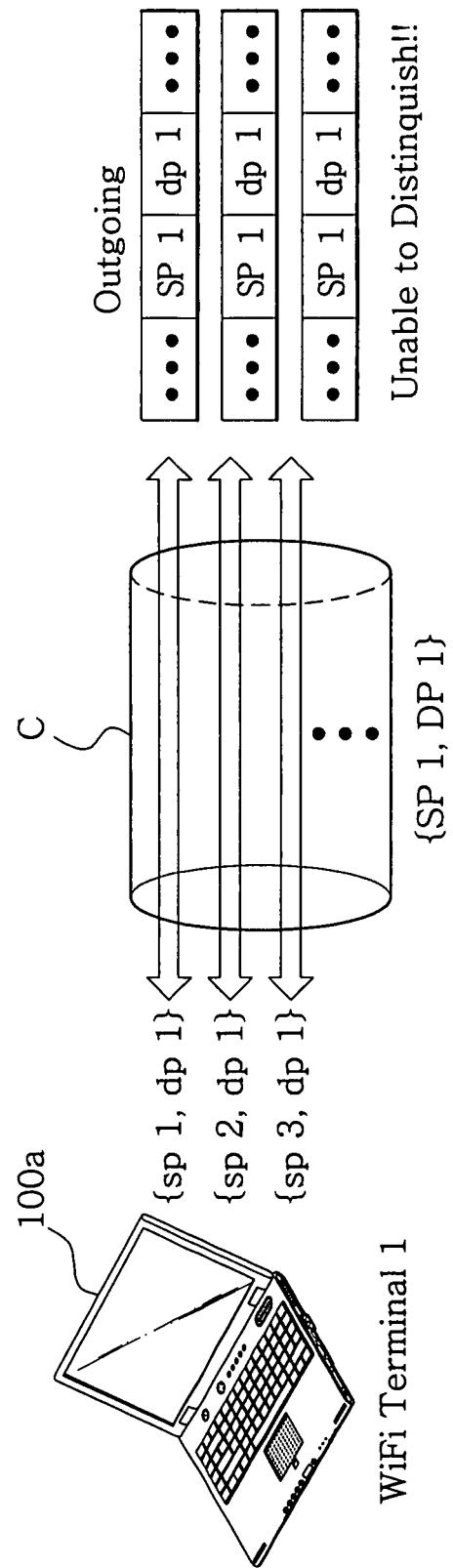
FIG. 9 illustrates an exemplary embodiment of translation between an IP address and a port number when a single WLAN terminal uses three different source ports with respect to one destination port for communication in a case where NAT is used.

FIG. 9 illustrates an exemplary embodiment of translation between an IP address and a port number when a single WiFi WLAN terminal uses three different source ports with respect to one destination port for communication in a case where NAT is used.

As shown in FIG. 9, a WiFi LAN terminal 100a forwards a user application flow having three different source ports sp1, sp2, and sp3 with respect to one destination port dp1 via a CID C. Here, {SPn, DPn} are source and destination port numbers given to the CID by the relay station 200, and {spn, dpn} are source and destination port numbers given for the service flow of each WiFi user.

When the WLAN terminal 100a forwards the user application flow having the three different source ports sp1, sp2, and sp3 with respect to one destination port dp1 via the CID C by translating the three different source ports sp1, sp2, and sp3 into the source port SP1 of the CID C, incoming flows are received as a response to such an outgoing flow and have the same source and destination ports. Accordingly, the incoming flows are indistinguishable from each other, which make it difficult to determine whether any application flow is used for packet transmission.

Meanwhile, the port translation may also be performed by using a separate port rather than the port allocated to the CID. In this case, however, relatively complex management of states, such as a currently used port, a previously used port and CID mapping, is required since one cannot know a CID to be mapped for an incoming packet.

Figure 10:
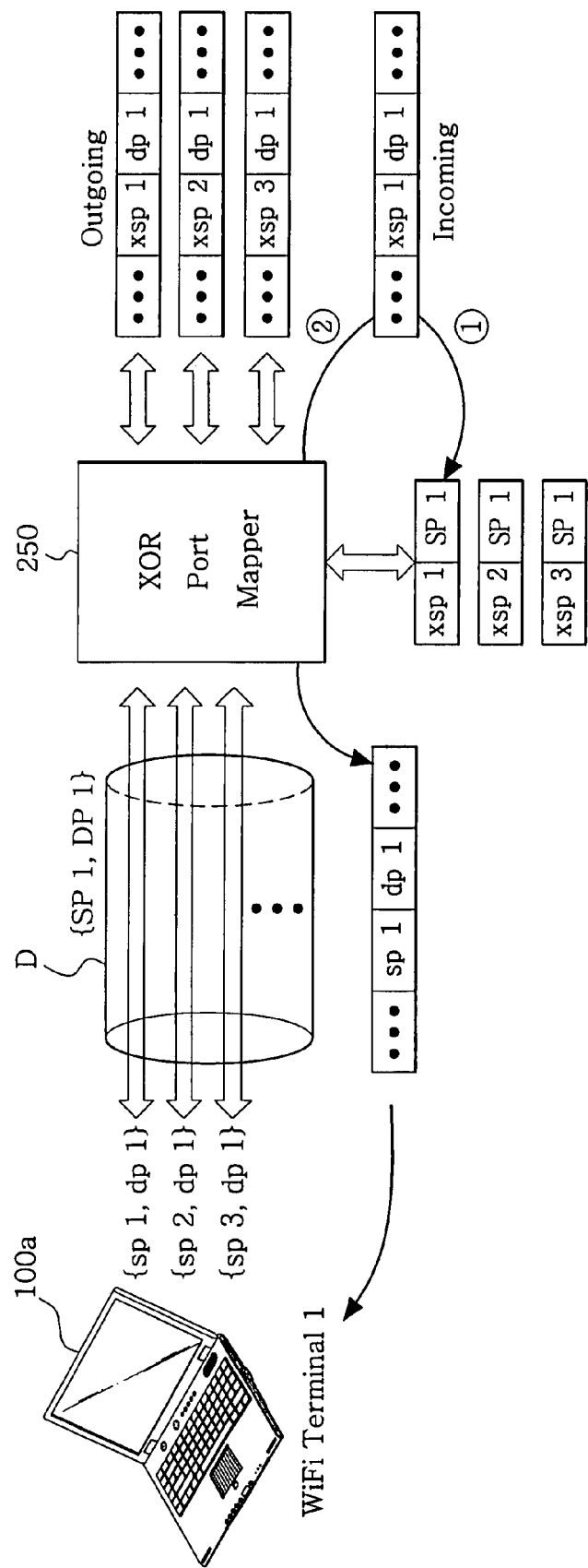
FIG. 10 illustrates port translation using an exclusive OR (XOR) operator according to the present invention.

FIG. 10 illustrates port translation using an exclusive OR (XOR) operator according to the present invention. An XOR port mapper is required for performing port mapping of a source port (spn) of a user application flow, and a source port (SPn) of a unique virtual link CID by using the exclusive OR operator, on an upper layer of the network in order to solve problems with existing NAT exploitation.

Referring to FIG. 10, the WiFi WLAN terminal 100a forwards the user application flow having the three different source ports sp1, sp2, and sp3 with respect to one destination port dp1 via the CID(D) having the source port and the destination port of {SP1, DP1}.

The XOR port mapper 250 performs port mapping for each flow. For example, the XOR port mapper 250 maps the source port sp1 of the flow forwarded via the CID D to the source port SP1 of the CID D to generate a new port number xsp1.

The XOR port mapper 250 transmits the IP packet having the translated port to a web server with a destination port on the Internet, and manages a mapping table of a source port SP1 of the CID D and the newly generated port number xsp1.

After transmitting the IP packet to the web server on the Internet, the XOR port mapper 250 receives an IP packet as a response, which has the destination port of xsp1 and the source port of dp1.

The XOR port mapper 250 recognizes, from the mapping table, that the received IP packet should be sent to the CID of the port SP1 mapped to the destination port xsp1 of the received IP packet, and creates sp1 through XOR operation of xsp1 and SP1 to deliver sp1 to the application process at a side of the WLAN terminal 100a.

According to the present invention, user-oriented Internet connectivity is provided to a user using an unlicensed band in the WiBro/WiMAX-based Broadband Wireless Access (BWA) environment, thereby achieving user management, such as QoS/traffic control and billing, even though the user uses the unlicensed band.

While the present invention has been described with reference to exemplary embodiments thereof, it will be understood by those skilled in the art that various changes in form and detail may be made therein without departing from the scope of the present invention as defined by the following claims.

What is claimed is:

1. A method for wireless broadband (WiBro) network interworking to a wireless local area network (WLAN) terminal by a relay station configured to connect the WLAN terminal to a WiBro network, the method comprising:
    setting up a connection through an initial process with the WiBro network;
    receiving an allocated Internet Protocol (IP) address to the WLAN terminal;
    receiving an allocated unique Connection IDentification (CID) corresponding to a Quality of Service (QoS) level of the WLAN terminal, the allocated unique CID allocated after allocation of an IP address to the WLAN terminal;
    mapping the allocated unique CID to the WLAN terminal to facilitate provisioning of Internet service to the WLAN terminal via a unique virtual link identified by the unique CID; and
    transmitting a notification of the allocated IP address to the WLAN terminal,
    wherein mapping the allocated unique CID to the WLAN terminal to facilitate provisioning of Internet service to the WLAN terminal via a unique virtual link identified by the unique CID comprises:
        creating a new port identifier by port mapping between a source port of an application flow forwarded from the WLAN terminal and a source port of the unique virtual link identified by the unique CID;
        creating a mapping table comprising port mapping information between the newly created port identifier and the source port of the unique virtual link identified by the unique CID; and
        determining a destination port of the application flow forwarded from the WLAN terminal by port mapping between a destination port of a second packet received from a web server and the source port of the unique virtual link identified by the unique CID mapped to the destination port of the application flow.

2. The method of claim 1, wherein the IP address comprises an IP version 6 (IPv6) or public IP version 4 (IPv4) address allocated in accordance with a dynamic host configuration protocol (DHCP).

3. The method of claim 1, wherein the unique CID is identified by a source IP, a destination IP, a source port, a destination port, and a security key.

4. The method of claim 1, wherein mapping the allocated unique CID to the WLAN terminal to facilitate provisioning of Internet service to the WLAN terminal via a unique virtual link identified by the unique CID further comprises:
    translating the source port of the application flow into the newly created port identifier, and transmitting a first packet comprising the translated port to the web server comprising a destination port, the first packet being associated with the application flow; and
    translating the destination port of the second packet received from the web server into the determined destination port and transmitting the second packet comprising the translated port to an application process of the WLAN terminal.

5. The method of claim 1, wherein creating a new port identifier by port mapping between a source port of an application flow forwarded from the WLAN terminal and a source port of the unique virtual link identified by the unique CID comprises performing port mapping through an exclusive OR operation of the source port of the application flow and the source port of the unique virtual link identified by the unique CID.

6. The method of claim 1, wherein determining a destination port of the application flow forwarded from the WLAN terminal by port mapping between a destination port of a second packet received from the web server and the source port of the unique virtual link identify by the unique CID mapped to the destination port of the second packet comprises performing port mapping through an exclusive OR operation of the destination port of the second packet received from the web server and the source port of the unique virtual link identified by the unique CID mapped to the destination port of the application flow.

7. A relay station for wireless broadband (WiBro) network interworking to a wireless local area network (WLAN) terminal, wherein the relay station is configured to:
    set up a connection through an initial process with the WiBro network;
    receive an allocated Internet Protocol (IP) address to the WLAN terminal;
    receive an allocated unique Connection IDentification (CID) corresponding to a Quality of Service (QoS) level of the WLAN terminal, the allocated unique CID allocated after allocation of an IP address to the WLAN terminal;
    map the allocated unique CID to the WLAN terminal to facilitate provisioning of Internet service to the WLAN terminal via a unique virtual link identified by the unique CID; and
    transmit a notification of the allocated IP address to the WLAN terminal, wherein mapping the allocated unique CID to the WLAN terminal to facilitate provisioning of Internet service to the WLAN terminal via a unique virtual link identified by the unique CID comprises:
creating a new port identifier by port mapping between a source port of an application flow forwarded from the WLAN terminal and a source port of the unique virtual link identified by the unique CID;
creating a mapping table comprising port mapping information between the newly created port identifier and the source port of the unique virtual link identified by the unique CID; and
determining a destination port of the application flow forwarded from the WLAN terminal by port mapping between a destination port of a second packet received from a web server and the source port of the unique virtual link identified by the unique CID mapped to the destination port of the application flow.

8. The relay station of claim 7, the relay station comprising:
a WiBro connection manager to perform a WiBro initial process with a WiBro radio access station;
a WLAN host access point (AP) to authorize association with the WLAN terminal in response to reception of a request for WiBro network connection from the WLAN terminal;
a WiBro interworking setup manager to set up, in response to successful user authentication by the WLAN host AP, the WiBro network connection according to an Internet Protocol (IP) network formed between the WLAN terminal and the relay station; and
a mapper to map, in response to successful set up of the WiBro network connection by the WiBro interworking setup manager, the unique CID allocated by the WiBro radio access station to the node ID of the WLAN terminal.

9. The relay station of claim 8, wherein:
the IP network formed between the WLAN terminal and the relay station is an IP version 4 (IPv4) network using a private address as the second IP address; and
the WiBro interworking setup manager is configured to:
create a new port identifier by port mapping between a source port of an application flow forwarded from the WLAN terminal and a source port of the unique virtual link identified by the unique CID; and
transmit and receive packets via utilization of a mapping table comprising port mapping information between the newly created port identifier and the source port of the unique virtual link identified by the unique CID.

10. The relay station of claim 7, wherein the relay station is further configured to:
translate the source port of the application flow into the newly created port identifier and transmit a first packet comprising the translated port to the web server comprising a destination port, the first packet being associated with the application flow; and
translate the destination port of the second packet received from the web server into the determined destination port and transmit the second packet comprising the translated port to an application process of the WLAN terminal.

11. The relay station of claim 7, wherein the IP address comprises an IP version 6 (IPv6) or public IP version 4 (IPv4) address allocated in accordance with a dynamic host configuration protocol (DHCP).

12. The relay station of claim 7, wherein the unique CID is identified by a source IP, a destination IP, a source port, a destination port, and a security key.

* * * * *